United States Patent
Parks et al.

(10) Patent No.: US 7,807,955 B2
(45) Date of Patent: Oct. 5, 2010

(54) IMAGE SENSOR HAVING REDUCED WELL BOUNCE

(75) Inventors: Christopher Parks, Rochester, NY (US); Gang Shi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 150 days.

(21) Appl. No.: 12/129,999

(22) Filed: May 30, 2008

(65) Prior Publication Data

US 2009/0294631 A1    Dec. 3, 2009

(51) Int. Cl.
*H01J 40/14* (2006.01)
*H01L 27/00* (2006.01)

(52) U.S. Cl. .................. 250/214 R; 250/208.1

(58) Field of Classification Search ........... 250/208.1, 250/214 R, 214.1, 206; 348/272, 302–308, 348/312; 257/257, 258, 288, 290, 291
See application file for complete search history.

(56) References Cited

U.S. PATENT DOCUMENTS

| | | | |
|---|---|---|---|
| 6,115,066 A | 9/2000 | Gowda et al. | |
| 6,271,554 B1 | 8/2001 | Nozaki et al. | |
| 6,369,853 B1 * | 4/2002 | Merrill et al. | 348/302 |
| 6,995,795 B1 | 2/2006 | Losee et al. | |
| 7,016,089 B2 | 3/2006 | Yoneda et al. | |
| 7,075,129 B2 | 7/2006 | Parks | |
| 2001/0012133 A1 | 8/2001 | Yoneda et al. | |
| 2002/0058353 A1 * | 5/2002 | Merrill | 438/57 |
| 2005/0001915 A1 | 1/2005 | Mabuchi et al. | |
| 2005/0116251 A1 | 6/2005 | Abe et al. | |
| 2006/0043393 A1 | 3/2006 | Okita et al. | |
| 2006/0043439 A1 | 3/2006 | Koizumi | |
| 2006/0060854 A1 | 3/2006 | Wakano et al. | |
| 2007/0024931 A1 | 2/2007 | Compton et al. | |
| 2007/0029465 A1 * | 2/2007 | Choi et al. | 250/208.1 |
| 2007/0069248 A1 | 3/2007 | Ohta | |

* cited by examiner

*Primary Examiner*—Thanh X Luu
*Assistant Examiner*—Jennifer Bennett
(74) *Attorney, Agent, or Firm*—Nancy R. Simon (57) ABSTRACT

A CMOS image sensor or other type of image sensor comprises a pixel array and sampling and readout circuitry associated with the pixel array. In conjunction with readout of one or more pixels in a selected group of pixels of the pixel array, a pixel power line signal of the array transitions from an inactive state to an active state, and a reset signal of a non-selected group of pixels of the pixel array transitions from an active state to an inactive state within a predetermined time prior to the transition of the pixel power line signal from its inactive state to its active state. This arrangement advantageously reduces well bounce in the image sensor. The image sensor may be implemented in a digital camera or other type of digital imaging device.

16 Claims, 6 Drawing Sheets

IMAGE SENSOR HAVING REDUCED WELL BOUNCE

FIELD OF THE INVENTION

The present invention relates generally to electronic image sensors for use in digital cameras and other types of imaging devices, and more particularly to sampling and readout techniques for use with an electronic image sensor.

BACKGROUND OF THE INVENTION

A typical electronic image sensor comprises a number of light sensitive picture elements ("pixels") arranged in a two-dimensional array. Such an image sensor may be configured to produce a color image by forming an appropriate color filter array (CFA) over the pixels. Examples of image sensors of this type are disclosed in U.S. Patent Application Publication No. 2007/0024931, entitled "Image Sensor with Improved Light Sensitivity," which is incorporated by reference herein.

As is well known, an image sensor may be implemented using complementary metal-oxide-semiconductor (CMOS) circuitry. In such an arrangement, each pixel typically comprises a photodiode and a number of transistors. The pixel transistors may be p-type MOS (PMOS) transistors, in which case the photodiode and the transistors are generally formed in an n-well region on a p-type substrate. Alternatively, the pixel transistors may be n-type MOS (NMOS) transistors, in which case the photodiode and the transistors are generally formed in a p-well region on an n-type substrate.

A problem that arises in CMOS image sensors having pixels formed in n-well or p-well regions of the type described above is known as "well bounce." This is an undesirable variation in well voltage that is typically due to the well bias voltage being introduced through well contacts in a ring around the periphery of the pixel array. These well contacts are close to edge pixels of the array but far from central pixels of the array. As a result, the resistance of the well from the edge of the array to its center can be very large, causing well bounce to occur in conjunction with switching operations associated with pixel sampling and readout.

A number of techniques have been developed in an attempt to alleviate the well bounce problem. One such technique involves increasing well conductivity, as described in, for example, U.S. Pat. No. 6,271,554, entitled "Solid-State Image Sensor Having a Substrate with an Impurity Concentration Gradient." However, an approach of this type requires process changes, which can increase manufacturing cost and complexity, and in any event may not provide a sufficient reduction in well bounce. Another technique involves the addition of well contacts within the pixel array, as described in, for example, U.S. Pat. No. 7,016,089, entitled "Amplification-Type Solid State Imaging Device with Reduced Shading." Unfortunately, this addition of well contacts within the pixel array takes up limited area that could otherwise be used for sensing light, and thus adversely impacts the performance of the image sensor. A further technique involves reducing the clock speed for certain signals associated with sampling and readout of the pixels. See, for example, U.S. Patent Application Publication No. 2005/0001915, entitled "Solid-State Imaging Device and Drive Control Method for the Same." However, slower clocking means it will take longer to read out the pixel data associated with a given image.

Accordingly, what is needed is a technique that significantly reduces or eliminates well bounce while avoiding the disadvantages associated with the above-noted conventional techniques.

SUMMARY OF THE INVENTION

Illustrative embodiments of the invention provide sampling and readout techniques that achieve substantial reductions in well bounce in a CMOS image sensor without the drawbacks of the techniques described above.

In accordance with one aspect of the invention, an image sensor comprises a pixel array and sampling and readout circuitry associated with the pixel array. In conjunction with readout of one or more pixels in a selected group of pixels of the pixel array, a pixel power line signal of the array transitions from an inactive state to an active state, and a reset signal of a non-selected group of pixels of the pixel array transitions from an active state to an inactive state within a predetermined time prior to the transition of the pixel power line signal from its inactive state to its active state. The image sensor may also be configured such that the pixel power line signal transitions from its active state to its inactive state in conjunction with completion of the readout of one or more of the pixels, and the reset signal transitions from its inactive state to its active state within a predetermined time after the transition of the pixel power line signal from its active state to its inactive state. The predetermined time prior to the transition of the pixel power line signal from its inactive state to its active state, and the predetermined time after the transition of the pixel power line signal from its active state to its inactive state may each be, for example, less than or equal to 500 nanoseconds.

The sampling and readout circuitry may comprise, for example, a controllable signal generator coupled to the pixel array and configured to generate at least one of the pixel power line signal and the reset signal.

In an illustrative embodiment, the pixel array comprises a plurality of pixels arranged in rows and columns, a pixel power line adapted to receive the pixel power line signal, and pixel output lines associated with respective ones of the columns. A given one of the pixels comprises a photodiode or other photosensitive element, and a first transistor having source and drain terminals coupled between the photosensitive element and a floating diffusion and having a gate terminal adapted to receive a transfer signal. The pixel array further includes a second transistor having source and drain terminals coupled between the pixel power line and one of the pixel output lines and a gate terminal coupled to the floating diffusion, and a third transistor having source and drain terminals coupled between the pixel power line and the floating diffusion and having a gate terminal adapted to receive the reset signal, with the photosensitive element and first, second and third transistors being formed in a well of a first conductivity type on a substrate of a second conductivity type.

In this embodiment, the image sensor is preferably configured to satisfy a charge balance equation specifying estimated charge displacements in the well associated with the respective transitions in the pixel power line signal and the reset signal. The charge balance equation may be satisfied, for example, by adjusting one or more of a capacitance $C_{RG}$ between the gate terminal of the third transistor and the well, a capacitance $C_{PP}$ between the pixel power line and the well, a change $\Delta V_{RG}$ in voltage level of the reset signal that occurs in the transition from its active state to its inactive state, and a change $\Delta V_{PP}$ in voltage level of the pixel power line signal that occurs in the transition from its inactive state to its active state.

An image sensor in accordance with the invention may be advantageously implemented in a digital camera or other type of imaging device, and provides improved performance in such a device through a substantial reduction in well bounce.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

The present invention will be illustrated herein in conjunction with particular embodiments of digital cameras, image sensors, and associated sampling and readout techniques. It should be understood, however, that these illustrative arrangements are presented by way of example only, and should not be viewed as limiting the scope of the invention in any way. Those skilled in the art will recognize that the disclosed arrangements can be adapted in a straightforward manner for use with a wide variety of other types of imaging devices, image sensors, and associated sampling and readout techniques.

Figure 1A:
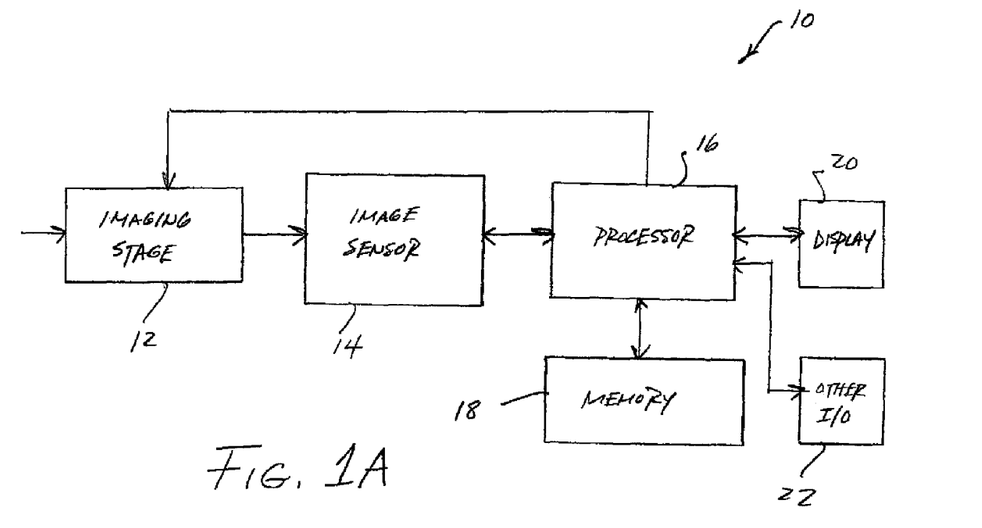
FIG. 1A is a block diagram of a digital camera having an image sensor incorporating sampling and readout circuitry in accordance with an illustrative embodiment of the invention.

FIG. 1A shows a digital camera 10 in an illustrative embodiment of the invention. In the digital camera, light from a subject scene is input to an imaging stage 12. The imaging stage may comprise conventional elements such as a lens, a neutral density filter, an iris and a shutter. The light is focused by the imaging stage 12 to form an image on an image sensor 14, which converts the incident light to electrical signals. The digital camera 10 further includes a processor 16, a memory 18, a display 20, and one or more additional input/output (I/O) elements 22.

Figure 1B:
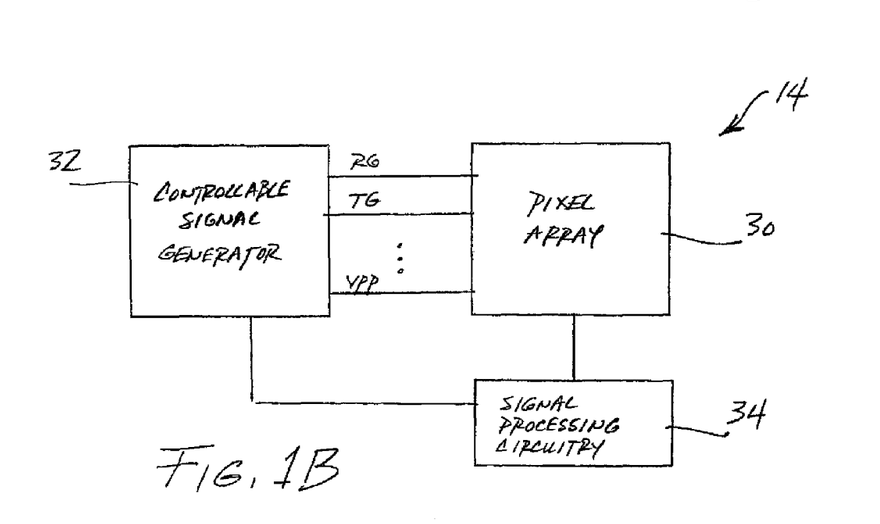
FIG. 1B is a block diagram of the image sensor of FIG. 1A.

The image sensor 14 is assumed in the present embodiment to be a CMOS image sensor, although other types of image sensors may be used in implementing the invention. As shown in FIG. 1B, image sensor 14 more particularly comprises a pixel array 30, a controllable signal generator 32 and signal processing circuitry 34. In other embodiments, one or both of elements 32 and 40 may be arranged external to the image sensor.

The pixel array 30 generally comprises a plurality of pixels arranged in rows and columns. The pixel array may also incorporate at least a portion of the sampling and readout circuitry of the digital camera 10, as will be described below in conjunction with FIGS. 2, 3, 5 and 8. For example, at least a portion of the sampling and readout circuitry may be formed integrally with the pixel array, for example, on a common integrated circuit with photodiodes and other elements of the pixel array. Elements 32 and 34 may also be viewed as part of the sampling and readout circuitry of the digital camera 10, and one or both of such elements may be formed integrally with the pixel array. Portions of the sampling and readout circuitry of the digital camera may also or alternatively be implemented in processor 16. Accordingly, the term "sampling and readout circuitry" as used herein is intended to be broadly construed so as to encompass any circuitry associated with the sampling and readout functionality of the digital camera 10, and portions of such circuitry may be arranged within image sensor 14 or elsewhere in the camera. As will become apparent, a given readout process as described herein will typically incorporate sampling operations, and thus the circuitry that implements such a process is referred to as "sampling and readout circuitry." This term should not be construed as requiring separate sampling and readout processes, or separate sampling circuitry and readout circuitry.

The image sensor 14 will typically be implemented as a color image sensor having an associated CFA pattern. Examples of CFA patterns that may be used with the image sensor 14 include those described in the above-cited U.S. Patent Application Publication No. 2007/0024931, although other CFA patterns may be used in other embodiments of the invention.

The controllable signal generator 32 may operate under control of the processor 16 to generate signals associated with sampling and readout of the pixel array 30, including, by way of example, reset gate (RG), transfer gate (TG) and pixel power (VPP) signals. Other types of signals used to select particular rows and columns of the pixel array for processing may be generated by the signal generator 32.

The signal processing circuitry 34 may comprise, for example, an analog signal processor for processing analog signals read out from the pixel array 30 and an analog-to-digital converter for converting such signals to a digital form suitable for processing by processor 16.

The processor 16 may comprise, for example, a microprocessor, a central processing unit (CPU), an application-specific integrated circuit (ASIC), a digital signal processor (DSP), or other processing device, or combinations of multiple such devices. Various elements of the imaging stage 12 and the image sensor 14 may be controlled by timing signals or other signals supplied from the processor 16.

The memory 18 may comprise any type of memory, such as, for example, random access memory (RAM), read-only memory (ROM), Flash memory, disk-based memory, or other types of storage elements, in any combination.

Sampling and readout techniques as described herein may be implemented at least in part in the form of software that is stored in memory 18 and executed by processor 16.

A given image captured by the image sensor 14 may be stored by the processor 16 in memory 18 and presented on display 20. The display 20 is typically an active matrix color liquid crystal display (LCD), although other types of displays may be used. The additional I/O elements 22 may comprise, for example, various on-screen controls, buttons or other user interfaces, network interfaces, memory card interfaces, etc.

Additional details regarding the operation of a digital camera of the type shown in FIG. 1A can be found, for example, in the above-cited U.S. Patent Application Publication No. 2007/0024931.

It is to be appreciated that the digital camera as shown in FIG. 1A may comprise additional or alternative elements of a type known to those skilled in the art. Elements not specifically shown or described herein may be selected from those known in the art. As noted previously, the present invention may be implemented in a wide variety of other types of digital cameras or image capture devices. Also, as mentioned above, certain aspects of the embodiments described herein may be implemented at least in part in the form of software executed by one or more processing elements of an image capture device. Such software can be implemented in a straightforward manner given the teachings provided herein, as will be appreciated by those skilled in the art.

The image sensor 14 as shown in FIG. 1B may be fabricated on a silicon substrate or other type of substrate. In a typical CMOS image sensor, each pixel of the pixel array includes a photodiode and associated circuitry for measuring the light level at that pixel.

Figure 2:
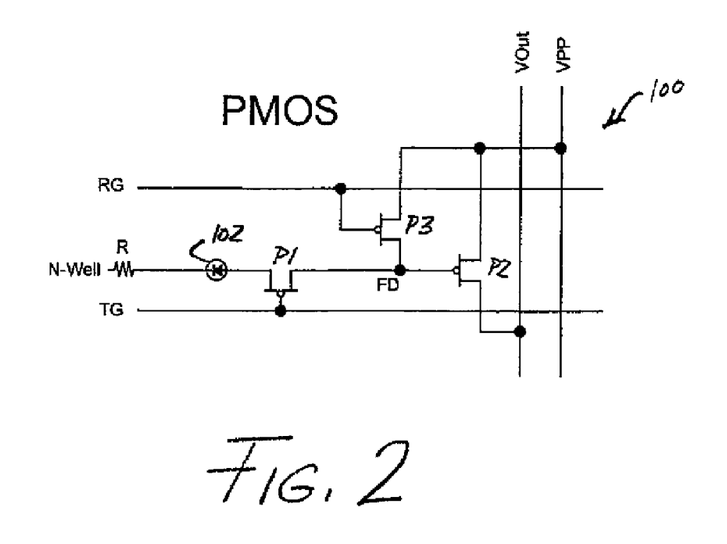
FIGS. 2 and 3 are schematic diagrams of respective PMOS and NMOS pixel circuitry that may be implemented in the image sensor of FIG. 1B.

FIG. 2 shows an illustrative embodiment of the circuitry associated with a given pixel 100 in the pixel array 30 of image sensor 14 of FIG. 1B. The pixel in this embodiment is assumed to be formed in an n-well on a p-type substrate of the image sensor. The pixel 100 comprises a photodiode 102 and three associated PMOS transistors P1, P2 and P3. The first transistor P1 transfers collected charge from the photodiode to a floating diffusion (FD) responsive to a transfer gate (TG) signal. The transistor P1 itself is also commonly referred to as a transfer gate. The second transistor P2 is an output transistor configured to amplify the signal on the floating diffusion and to supply the amplified signal to an output voltage column line VOut. The third transistor P3 resets the floating diffusion by coupling it to a pixel power supply voltage VPP responsive to a reset gate (RG) signal.

It should be noted that each pixel need not include its own reset transistor and output transistor as in the FIG. 2 arrangement. Typically, a given reset transistor and a given output transistor are shared among multiple pixels. An example of such a sharing arrangement will be described below in conjunction with FIG. 8. Accordingly, the term "pixel" as used herein is intended to encompass, for example, a grouping of circuitry elements such as 102, P1, P2 and P3, or an alternative grouping comprising just 102 and P1 in an embodiment where pixel 100 shares P2 and P3 with other pixels. Numerous alternative arrangements of pixel circuitry may be used in these and other embodiments of the invention.

The element R in FIG. 2 denotes the resistance of the n-well between the pixel 100 and the nearest n-well contact. As noted previously herein, the well bias voltage is typically introduced through well contacts in a ring around the periphery of the pixel array. These well contacts are close to edge pixels of the array but far from central pixels of the array, and thus the value of R for a pixel near the center of the array can be very large, leading to well bounce issues that are addressed in a manner to be described in greater detail below.

At least a portion of the pixel circuitry of FIG. 2 may be repeated for each of the other pixels of the array 30. Pixels in the same row of the array share a common RG signal, while pixels in the same column of the array share the output voltage column line VOut. As indicated previously, the output transistor P2 and reset transistor P3 of the pixel circuitry may be shared between multiple pixels.

Figure 3:
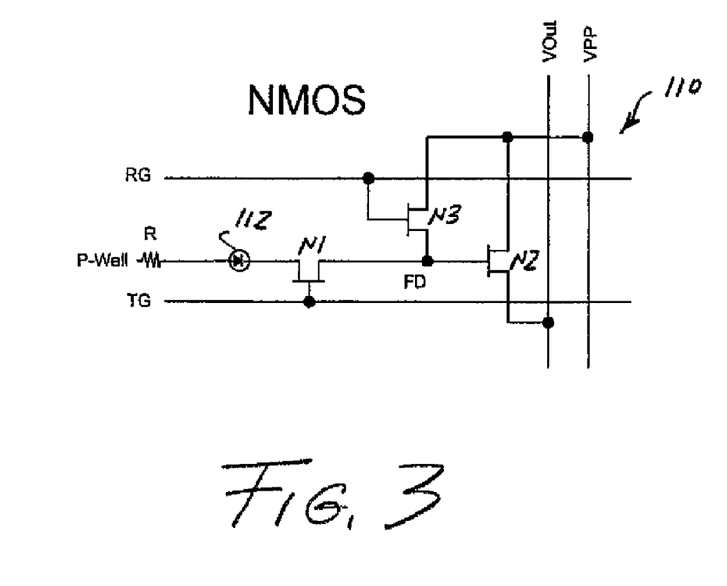

FIG. 3 shows an NMOS equivalent of the PMOS pixel 100 described in conjunction with FIG. 2. In this embodiment, NMOS pixel 110 comprises photodiode 112 and NMOS transistors N1, N2 and N3. These elements are assumed to be formed in a p-well on an n-type substrate of the image sensor 14. The operation of the NMOS pixel 110 is analogous to that described previously for the PMOS pixel 100.

Figure 4:
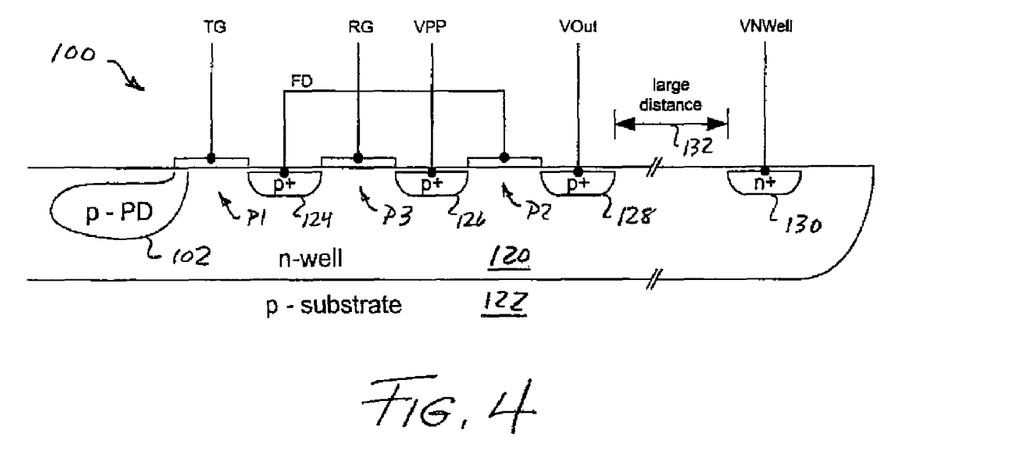
FIG. 4 is a cross-sectional view of a portion of an image sensor comprising the PMOS pixel circuitry of FIG. 2 as formed in an n-well on a p-type substrate of the image sensor.

FIG. 4 shows a cross-sectional view of the PMOS pixel 100 of FIG. 2. It can be seen that the photodiode 102 and the three PMOS transistors are formed in an n-well 120 on a p-type substrate 122. The transistors P1, P2 and P3 are formed utilizing p+ diffusion regions 124, 126 and 128 as indicated. VNwell denotes a bias voltage applied to the n-well 120 via an n+contact 130. As mentioned above, there may be a large distance between the bias voltage contact and the circuitry of the pixel 100, as illustrated by arrow 132 in FIG. 4. This large resistance, represented by R in FIG. 2, can make the n-well voltage unstable, leading to the well bounce problem previously described.

We have determined that well bounce in image sensors incorporating PMOS or NMOS pixels of the type described above is a function of capacitive coupling between the RG signal lines and the n-well and also between the VPP signal lines and the n-well. For example, these capacitive couplings can lead to excessive well bounce when the RG and VPP signals are switched in conjunction with row readout. The manner in which such well bounce can be eliminated or otherwise reduced will now be described with reference to FIGS. 5 through 7.

Figure 5:
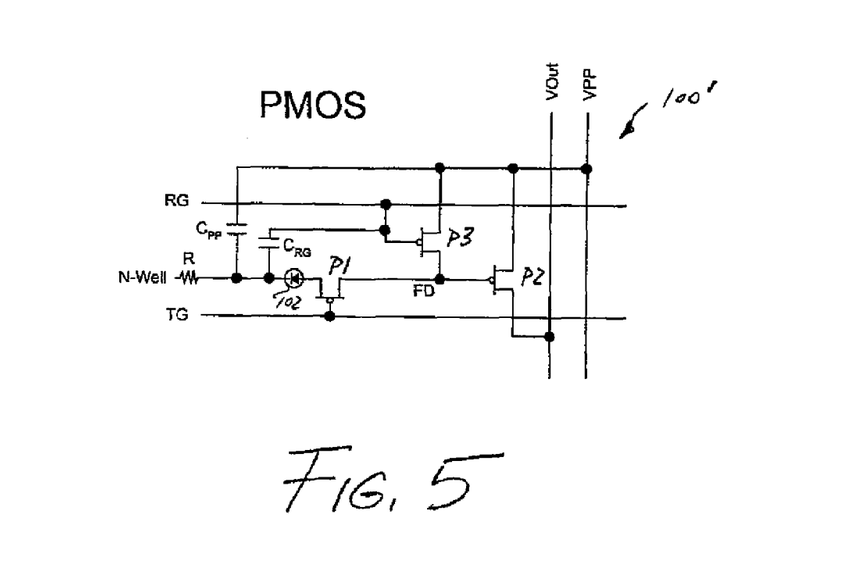
FIG. 5 is a schematic diagram of PMOS pixel circuitry similar to that of FIG. 2 but showing capacitances that may be adjusted in accordance with an illustrative embodiment of the invention.

FIG. 5 shows a PMOS pixel 100' that is similar to the PMOS pixel 100 of FIGS. 2 and 4 but includes capacitances that may be adjusted in accordance with an illustrative embodiment of the invention. The capacitance $C_{PP}$ represents the capacitance between the VPP signal line and the n-well 120. The capacitance $C_{PP}$ may more specifically indicate, for example, the capacitance between the p+ diffusion region 126, associated with reset transistor P3 and output transistor P2, and the well. The capacitance $C_{RG}$ represents the capacitance between the gate terminal of the reset transistor P3 and the n-well 120.

Figure 6:
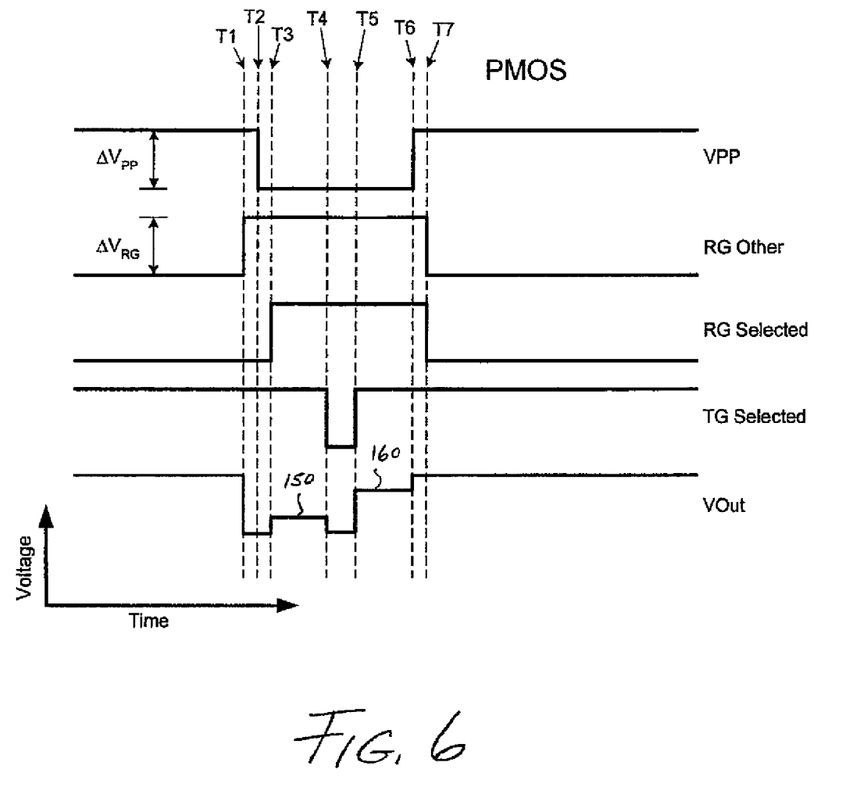
FIG. 6 is a timing diagram illustrating the operation of the PMOS pixel circuitry of FIG. 5.

FIG. 6 illustrates an exemplary row readout process for a pixel array 30 constructed using PMOS pixels 100' configured as shown in FIG. 5. Prior to readout of a given row, the RG signals for the respective rows of the pixel array are all in an active state. This connects all floating diffusions to the VPP line which is in an inactive state. Thus, all output transistors P2 are in an inactive state because their inputs are inactive.

The terms "active state" and "inactive state" will be used herein to refer to the binary logic states of a given signal, signal line, transistor or floating diffusion. The active and inactive states of a transistor may be viewed as generally corresponding to "on" and "off" states, respectively. For PMOS transistors such as P1, P2 and P3, logic low input signals will turn these devices on, and logic high input signals will turn these devices off. Thus, the active states of the TG, RG and VPP signals and their associated signal lines in the PMOS pixel circuitry of FIG. 5 correspond to low voltages, and the inactive states of these signals and associated signal lines correspond to higher voltages.

The higher voltage level associated with an inactive state of a given signal or signal line is typically slightly less than the bias voltage of the n-well in order to prevent charge leakage from the floating diffusion over the transfer gate P1 and into the photodiode 102. For example, if the n-well bias voltage is 2.7 volts, a given inactive state voltage level may be on the order of about 2.2 volts.

To select the given row for readout, all RG signals other than that of the given row are switched to an inactive state at time T1. Next the VPP voltage is switched to an active state at time T2. Since the RG signal of the selected row is still active, all floating diffusions and output transistors of that row also switch to their active states. The floating diffusions and output transistors of all other rows remain in their inactive states.

It is desirable for all RG signals other than that of the selected row to transition from active to inactive prior to the VPP signal transitioning from inactive to active. This ensures that all of the floating diffusions in the non-selected rows remain in their inactive states, which advantageously tends to reduce well bounce. Generally, at least one of the RG signals other than that of the selected row transitions from its active state to its inactive state within a predetermined time prior to the transition of the VPP line from its inactive state to its active state. This predetermined time prior to the transition of the VPP line from its inactive state to its active state is preferably less than or equal to approximately 500 nanoseconds (ns). For example, a value on the order of 200 ns may be used in a given embodiment.

The RG signal of the selected row is then switched to the inactive state at time T3 and the output voltage column line VOut is sampled to obtain a first output voltage level 150. Next the TG signal of the selected row is pulsed from inactive to active and back to inactive. This transfers charge from the photodiodes of that row to their respective floating diffusions. The duration of the pulse is from time T4 to time T5. The output voltage column line VOut is then sampled again to obtain a second voltage level 160. The difference between the first and second voltage levels 150 and 160 provides a measure of the charge magnitude for the corresponding photodiode. This difference may be determined, for example, in other circuitry associated with the image sensor 14, such as the signal processing circuitry 34, or in another element of the digital camera of FIG. 1A, such as processor 16. The charge magnitudes for the other photodiodes in the selected row are determined in a similar manner.

To complete the row readout process, the VPP voltage is switched back to the inactive state at time T6, and then all of the RG signals are switched to the active state at time T7. It is desirable for the VPP signal to transition from active to inactive prior to the RG signals transitioning from inactive to active. This prevents the floating diffusions of the non-selected rows from changing voltage, again tending to reduce well bounce. Generally, at least one of the RG signals other than that of the selected row transitions from its inactive state to its active state within a predetermined time after the transition of the VPP line from its active state to its inactive state. This predetermined time after the transition of the VPP line from its active state to its inactive state is preferably less than or equal to approximately 500 ns. Again, a value on the order of 200 ns may be used in a given embodiment, as one particular example, although other values could be used.

The foregoing described the readout process for a given selected row of pixels in the pixel array. Another row of the pixel array can then be selected for readout in a similar manner. Also, the disclosed techniques can be adapted in a straightforward manner to read fewer than all of the pixels in a given row, such as a designated portion of a row. Selected groupings other than rows or portions of rows can be used in alternative embodiments.

Further reductions in well bounce may be achieved in the illustrative embodiments through the use of charge balancing as will now be described. As indicated above, at time T1 in the readout process of FIG. 6, the RG signals of all rows other than the selected row transition from an active state to an inactive state. This turns off the reset transistors P3 in all rows other than the selected row. The amount of charge in the n-well that is displaced by turning off the reset transistor P3 of a given pixel 100' in a non-selected row may be estimated as $C_{RG}\Delta V_{RG}$, where $\Delta V_{RG}$ is the change in voltage level of the RG signal as indicated in FIG. 6. Similarly, the amount of charge in the n-well that is displaced by transitioning the VPP signal for that pixel from its inactive state to its active state at time T2 may be estimated as $C_{PP}\Delta V_{PP}$, where $\Delta V_{PP}$ is the change in voltage level of the VPP signal as indicated in FIG. 6. If T2 and T1 are separated by a sufficiently small time period, such as 500 ns or less as noted above, then the two charge displacements will substantially cancel each other out:

$$C_{RG}\Delta V_{RG} + C_{PP}\Delta V_{PP} \cong 0.$$

This equation is an example of what is more generally referred to herein as a charge balancing equation.

A similar charge balancing can be achieved if times T6 and T7 are separated by a sufficiently small time period, again about 500 ns or less as previously indicated. In this case, the VPP signal transitions from its active state to its inactive state at time T6, followed at time T7 by the RG signals of all of the rows of the array transitioning from inactive to active states. Once again, transitioning RG and VPP with opposite polarities at nearly the same time cancels out the charge displacements on the n-well caused by the capacitances $C_{PP}$ and $C_{RG}$.

The charge balancing equation can be satisfied by adjusting one or more of the capacitances $C_{PP}$ and $C_{RG}$ or one or more of the voltage level changes $\Delta V_{RG}$ and $\Delta V_{PP}$, in any combination. Thus, an embodiment of the invention may configure the image sensor 14 such that the values of the capacitances $C_{PP}$ and $C_{RG}$ of the pixels are adjusted based on given values of voltage level changes $\Delta V_{RG}$ and $\Delta V_{PP}$ so as to satisfy the charge balance equation. The capacitance $C_{PP}$ can be adjusted, for example, by changing the size of the source diffusion regions associated with the reset or output transistors. The capacitance $C_{RG}$ can be adjusted, for example, by changing the area of the reset transistor gate terminal or by connecting the reset transistor to an additional p+ diffusion region. Alternatively, the capacitances $C_{PP}$ and $C_{RG}$ may be given, for example, based on known parasitic capacitance values within the image sensor, and one or both of the voltage level changes $\Delta V_{RG}$ and $\Delta V_{PP}$ may be adjusted so as to satisfy the charge balance equation. Adjustments in the voltage level changes can be achieved, for example, by appropriate controlled generation of RG and VPP signals in controllable signal generator 32 or other signal generation circuitry associated with or incorporated in the image sensor 14. For example, a number of different selectable signal levels may be provided, with the selection of particular levels for use in a given image sensor being based on detected levels of well bounce.

A given such adjustment in capacitances or voltage level changes may be made uniformly throughout the pixel array. It is also possible that such adjustments may be made only for certain portions of the array, such as central portions that are more susceptible to the well bounce problem.

The above-noted exemplary charge balancing equation may alternatively be expressed as follows:

$$|C_{RG}\Delta V_{RG}| \cong |C_{PP}\Delta V_{PP}|,$$

with the approximation being met if the two magnitudes $|C_{RG}\Delta V_{RG}|$ and $|C_{PP}\Delta V_{PP}|$ are within a designated percentage of one another, such as within 25% or less of one another. Other charge balancing equations specifying estimated charge displacements in the well associated with the relevant transitions in the RG and VPP signals may be used in alternative embodiments to provide the desired reduction in well bounce.

Figure 7:
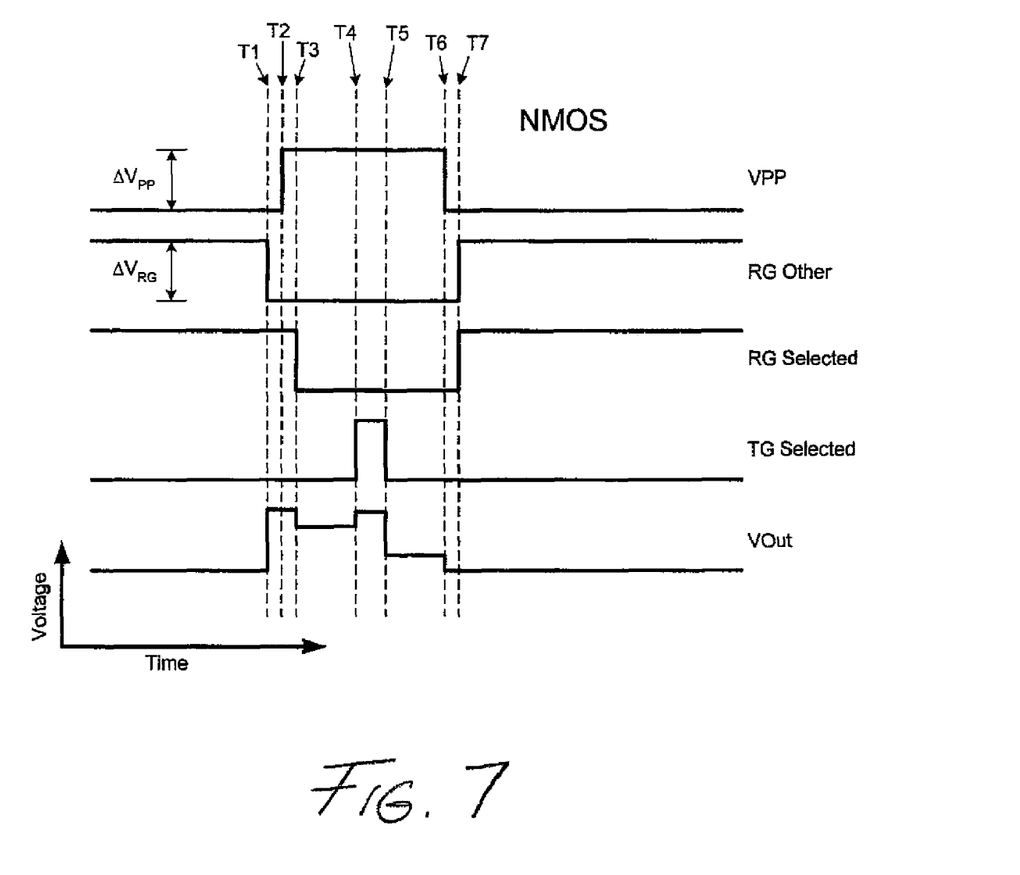
FIG. 7 is a timing diagram illustrating the operation of an NMOS version of the pixel circuitry of FIG. 5.

As indicated above, the invention can be implemented using NMOS pixels rather than PMOS pixels. FIG. 7 shows a timing diagram that is generally the same as FIG. 6 but for an embodiment with NMOS pixels. It can be seen that the voltage levels in the FIG. 7 timing diagram are complementary to those of the FIG. 6 diagram, but the signal transition timing and basic operation are otherwise the same.

Figure 8:
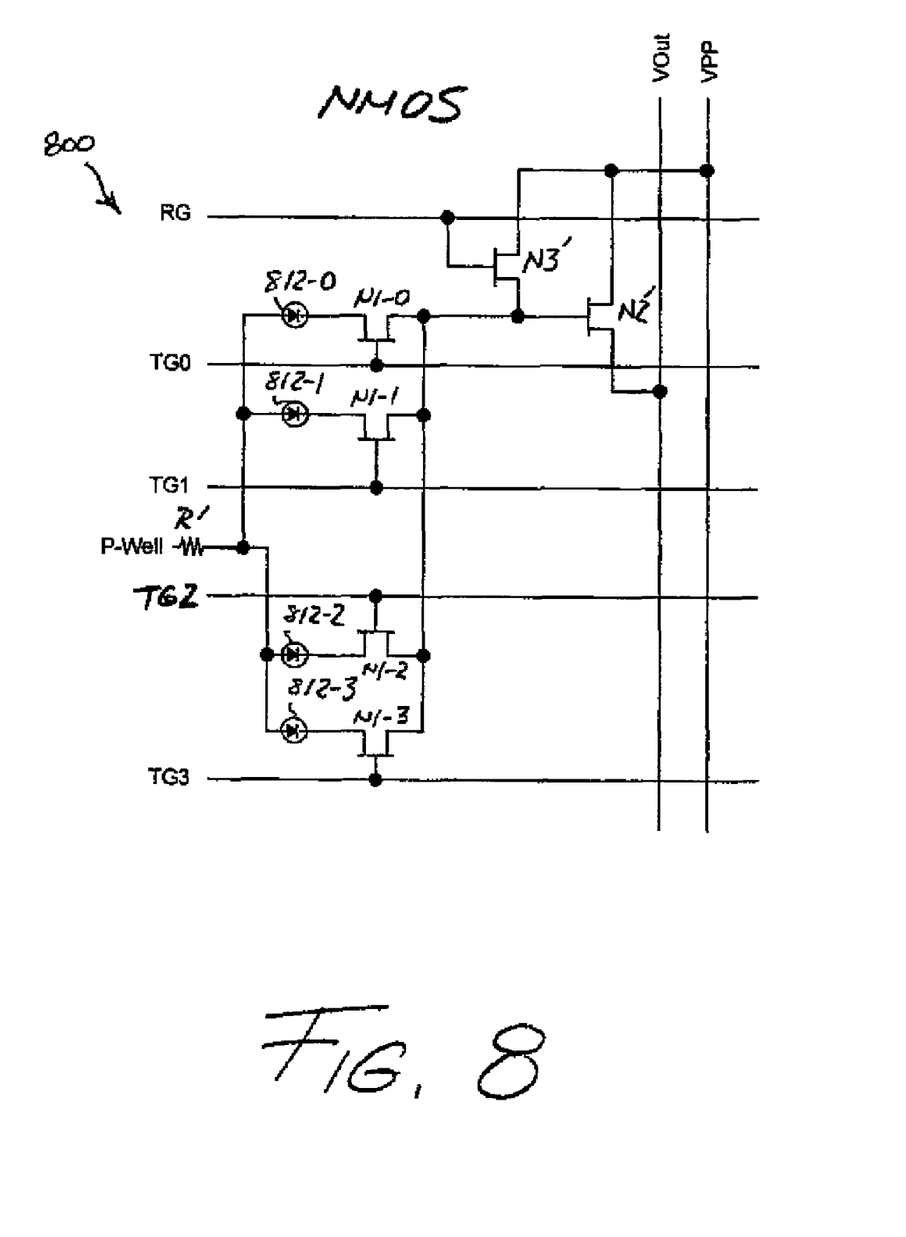
FIG. 8 is a schematic diagram of a portion of a pixel array illustrating one example of NMOS pixel circuitry in which multiple pixels share an output transistor and a reset transistor.

It was also noted above that a given pixel may share a reset transistor and an output transistor with one or more other pixels of the pixel array. FIG. 8 shows a version of the NMOS pixel circuitry configured with sharing of an output transistor N2' and a reset transistor N3' by a group of four pixels. The four pixels include respective photodiodes 812-0, 812-1, 812-2 and 812-3 coupled to respective transfer gates N1-0, N1-1, N1-2 and N1-3 as shown. The resistance R' in this embodiment represents the resistance of the p-well in which the photodiodes and the NMOS transistors are formed. An analogous set of PMOS circuitry may be formed in a complementary manner. Of course, numerous alternative arrangements for sharing of output transistors, reset transistors, floating diffusions or other types of pixel circuitry among multiple pixels may be used. For example, more or fewer than four pixels may be part of a given group configured to share pixel circuitry.

The above-described illustrative embodiments advantageously reduce well bounce in an image sensor comprising PMOS or NMOS pixels. In other embodiments, different types of pixel circuitry may be used, as well as different types of signal timing and charge balancing arrangements.

The image sensor 14 may include additional sampling and readout circuitry, such as, for example, otherwise conventional column circuitry and row circuitry commonly utilized in sampling and readout of pixel array. Such additional circuitry, being well understood by those skilled in the art, is not described in detail herein.

The invention has been described in detail with particular reference to certain illustrative embodiments thereof, but it will be understood that variations and modifications can be effected within the scope of the invention as set forth in the appended claims. For example, other types of image sensors and digital imaging devices may be used, using alternative pixel array configurations and other types of sampling and readout circuitry and processes. Also, the particular assumptions made in conjunction with the illustrative embodiments need not apply in alternative embodiments. These and other alternative embodiments will be readily apparent to those skilled in the art.

PARTS LIST

10 digital camera
12 imaging stage
14 image sensor
16 processor
18 memory
20 display
22 other input/output (I/O) elements
30 pixel array
32 controllable signal generator
34 signal processing circuitry
100 PMOS pixel
102 photodiode
110 NMOS pixel
112 photodiode
120 n-well
122 p-type substrate
124 p+ diffusion region
126 p+ diffusion region
128 p+ diffusion region
130 n+ contact
150 first output voltage level
160 second output voltage level
800 pixel circuitry
812 photodiode
P1 PMOS transfer transistor
P2 PMOS output transistor
P3 PMOS reset transistor
N1 NMOS transfer transistor
N2 NMOS output transistor
N3 NMOS reset transistor
R well resistance

The invention claimed is:

1. An image sensor comprising:
   a pixel array including
     a plurality of pixels with at least one pixel comprising a first transistor having a gate terminal adapted to receive a transfer signal disposed between a photosensitive element and a floating diffusion;
   a second transistor including a gate terminal connected to the floating diffusion, a first diffusion region connected to a pixel power line, and a second diffusion region connected to a pixel output line; and
   a third transistor including a gate terminal adapted to receive a reset signal disposed between the floating diffusion and the first diffusion region, wherein one or more pixels are connected to the second and third transistors and each photosensitive element, floating diffusion, first diffusion region, and second diffusion region are formed in a well of a first conductivity type; and
   sampling and readout circuitry associated with the pixel array;
   wherein in conjunction with readout of one or more pixels in a selected group of pixels of the pixel array, a pixel power line signal of the array transitions from an inactive state to an active state, and a reset signal of a non-selected group of pixels of the pixel array transitions from an active state to an inactive state within a predetermined time prior to the pixel power line signal transitioning from its inactive state to its active state, and wherein said image sensor is configured to satisfy a charge balance equation given by:

$$C_{RG}\Delta V_{RG} + C_{PP}\Delta V_{PP} \cong 0,$$

where $C_{RG}$ is capacitance between the gate terminal of the third transistor and the well, $C_{PP}$ is capacitance between the pixel power line and the well, $\Delta V_{RG}$ is a change in voltage level of the reset signal in said transition from its active state to its inactive state, and $\Delta V_{PP}$ is a change in voltage level of the pixel power line signal in said transition from its inactive state to its active state.

2. The image sensor of claim 1 wherein the sampling and readout circuitry comprises a controllable signal generator coupled to the pixel array and configured to generate at least one of the pixel power line signal and the reset signal.

3. The image sensor of claim 1 wherein well of the first conductivity type is on a substrate of a second conductivity type.

4. The image sensor of claim 1 wherein the predetermined time prior to the transition of the pixel power line signal from its inactive state to its active state is less than or equal to approximately 500 nanoseconds.

5. The image sensor of claim 1 wherein the pixel power line signal transitions from its active state to its inactive state in conjunction with completion of said readout of one or more of the pixels, and the reset signal transitions from its inactive state to its active state within a predetermined time after the transition of the pixel power line signal from its active state to its inactive state.

6. The image sensor of claim 5 wherein the predetermined time after the transition of the pixel power line signal from its active state to its inactive state is less than or equal to approximately 500 nanoseconds.

7. The image sensor of claim 1 wherein said readout of one or more pixels in a selected group of pixels comprises readout of pixels in a selected row of pixels and the reset signal is applied to each of a plurality of reset transistors associated with one or more non-selected rows of pixels.

8. The image sensor of claim 1 wherein the charge balance equation is satisfied if the two magnitudes $|C_{RG}\Delta V_{RG}|$ and $|C_{PP}\Delta V_{PP}|$ are within 25% of one another.

9. The image sensor of claim 3 wherein said first, second, and third transistors comprise PMOS transistors and said well comprises an n-well formed on a p-type substrate of the image sensor.

10. The image sensor of claim 3 wherein said first, second, and third transistors comprise NMOS transistors and said well comprises a p-well formed on an n-type substrate of the image sensor.

11. A method for use with an image sensor comprising a pixel array, the method comprising:
in conjunction with readout of one or more pixels in a selected group of pixels of the pixel array, controlling a pixel power line signal of the array to transition from an inactive state to an active state, and controlling a reset signal of a non-selected group of pixels of the pixel array to transition from an active state to an inactive state within a predetermined time prior to the transition of the pixel power line signal from its inactive state to its active state; wherein said image sensor is configured to satisfy a charge balance equation specifying estimated charge displacements in a well associated with the respective transitions in said pixel power line signal and said reset signal.

12. The method of claim 11 wherein the predetermined time prior to the transition of the pixel power line signal from its inactive state to its active state is less than or equal to approximately 500 nanoseconds.

13. The method of claim 11 further comprising controlling the pixel power line signal to transition from its active state to its inactive state in conjunction with completion of said readout of one or more of the pixels, and controlling the reset signal to transition from its inactive state to its active state within a predetermined time after the transition of the pixel power line signal from its active state to its inactive state.

14. The method of claim 13 wherein the predetermined time after the transition of the pixel power line signal from its active state to its inactive state is less than or equal to approximately 500 nanoseconds.

15. A digital imaging device comprising:
an image sensor; and
one or more processing elements configured to process outputs of the image sensor to generate a digital image;
wherein said image sensor comprises:
a pixel array including
a plurality of pixels with at least one pixel comprising a first transistor having a gate terminal adapted to receive a transfer signal disposed between a photosensitive element and a floating diffusion;
a second transistor including a gate terminal connected to the floating diffusion, a first diffusion region connected to a pixel power line, and a second diffusion region connected to a pixel output line; and
a third transistor including a gate terminal adapted to receive a reset signal disposed between the floating diffusion and the first diffusion region, wherein one or more pixels are connected to the second and third transistors; and
sampling and readout circuitry associated with the pixel array;
wherein in conjunction with readout of one or more pixels in a selected group of pixels of the pixel array, a pixel power line signal of the array transitions from an inactive state to an active state, and a reset signal of a non-selected group of pixels of the pixel array transitions from an active state to an inactive state within a predetermined time prior to the pixel power line signal transitioning from its inactive state to its active state, and wherein said image sensor is configured to satisfy a charge balance equation specifying estimated charge displacements in a well associated with the respective transitions in said pixel power line signal and said reset signal.

16. The digital imaging device of claim 15 wherein said imaging device comprises a digital camera.

* * * * *